Figure 1:
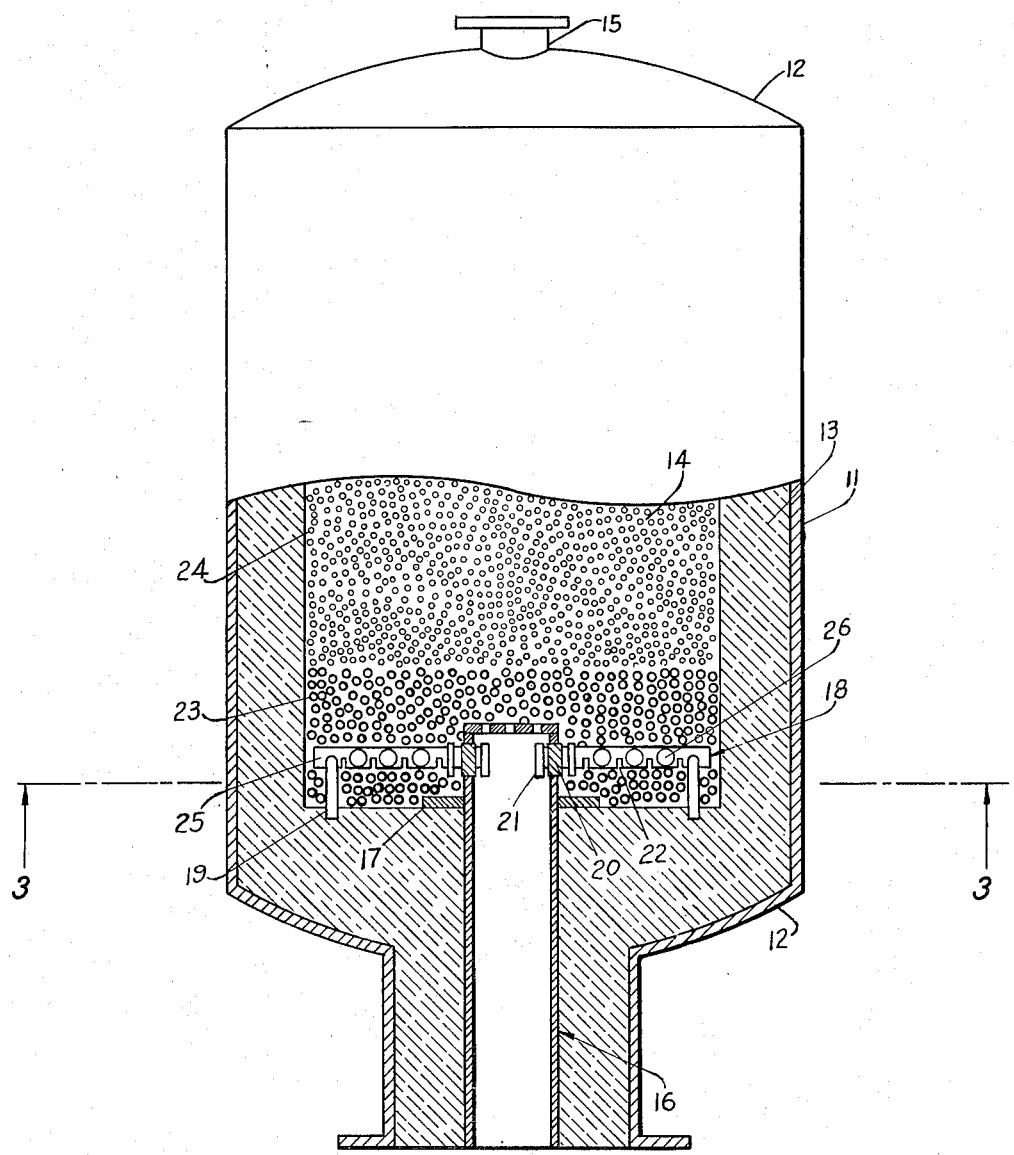

Dec. 29, 1953  A. R. REHRIG  2,664,347
CATALYST CHAMBER COLLECTOR SYSTEM
Filed Oct. 8, 1947  3 Sheets-Sheet 2

INVENTOR.
A. R. REHRIG
BY *Hudson and Young*
ATTORNEYS

Dec. 29, 1953  A. R. REHRIG  2,664,347
CATALYST CHAMBER COLLECTOR SYSTEM
Filed Oct. 8, 1947  3 Sheets-Sheet 3

INVENTOR.
A. R. REHRIG
BY Hudson and Young
ATTORNEYS

Patented Dec. 29, 1953

2,664,347

UNITED STATES PATENT OFFICE 2,664,347

CATALYST CHAMBER COLLECTOR SYSTEM

Alexander R. Rehrig, Phillips, Tex., assignor to Phillips Petroleum Company, a corporation of Delaware Application October 8, 1947, Serial No. 778,587

14 Claims. (Cl. 23—288)

This invention relates to an improved reaction chamber. In one of its more specific aspects, it relates to means for collecting effluent materials in a reaction chamber containing solid contact material. In another of its more specific aspects, it relates to an improved apparatus for treating or converting hydrocarbons, in the presence of solid contact material, at elevated temperatures.

Many processes now employed in refining, treating, and/or catalytic conversion of hydrocarbons involve the use of chambers having fixed beds of particulate solid contact material. This contact material may comprise any one or a combination of materials selected from a large group of materials used to treat or to catalytically effect the desired reaction. Such materials may include diatomaceous earth, filtration clays, fuller's earth, bauxite, acid treated clays, synthetic silica materials, or any other suitable granular or extruded or pelleted material. The efficiency with which such processes may be operated depends upon many critical factors such as temperature, pressure, or mechanical stability of the reaction chamber.

It is common in such processes to inject the reactant material into the upper portion of a reaction chamber and to pass such materials downwardly through a fixed bed of particulate contact material. In processes utilizing that method of treating or converting, it has been necessary to provide suitable means for collecting and removing effluent materials from the reaction chamber. One such method commonly used has been to close a lower portion of the chamber from the balance of the chamber by perforate closure means, such as a perforate plate or screen. The catalyst material is then placed in the reaction chamber and supported on the plate or screen leaving the lower portion of the reaction chamber open for the purpose of collecting and removing the effluent. Such means have generally proved satisfactory in processes utilizing low temperatures. At more elevated temperatures, however, these plates or screens may fail because of the relatively high temperatures and resultant expansion, unless considerable expense is incurred by constructing such means of high alloy steel.

An object of the invention is to provide an improved apparatus for treating or converting hydrocarbons in the presence of solid particulate contact material. Another object is to provide an improved method for treating or converting hydrocarbons in the presence of solid particulate contact materials. Another object is to provide an improved means for collecting effluent materials of a reaction chamber containing solid contact material. Another object is to provide an effluent collecting system which is satisfactory for use in a reaction chamber containing solid contact material and which chamber is operated at relatively elevated temperatures. Another object is to provide an improved means for collecting and removing effluent materials from a reaction chamber. Other and further objects will be apparent to those skilled in the art from the accompanying discussion and drawing.

The present invention provides a solution for the problem of economically collecting and removing effluent materials from a reaction chamber containing particulate contact material during operation at elevated temperatures. Understanding of the invention will be facilitated by reference to the accompanying diagrammatic drawings.

Figure 3:
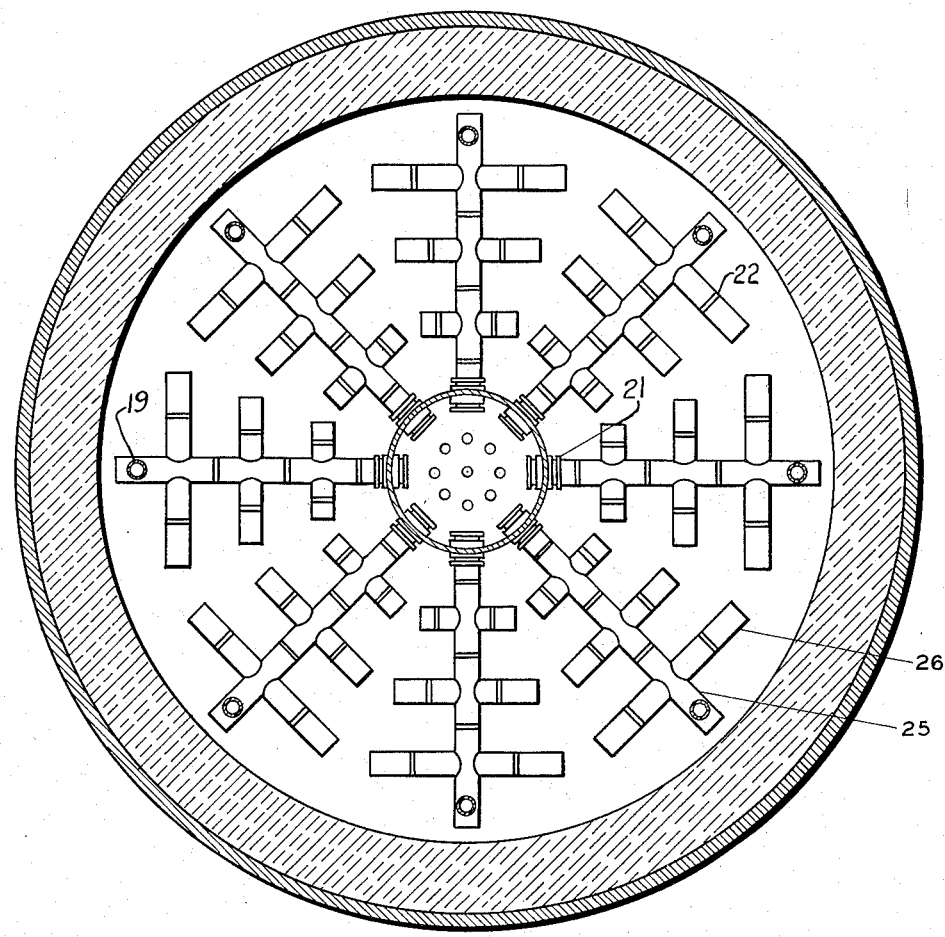
Figure 2:
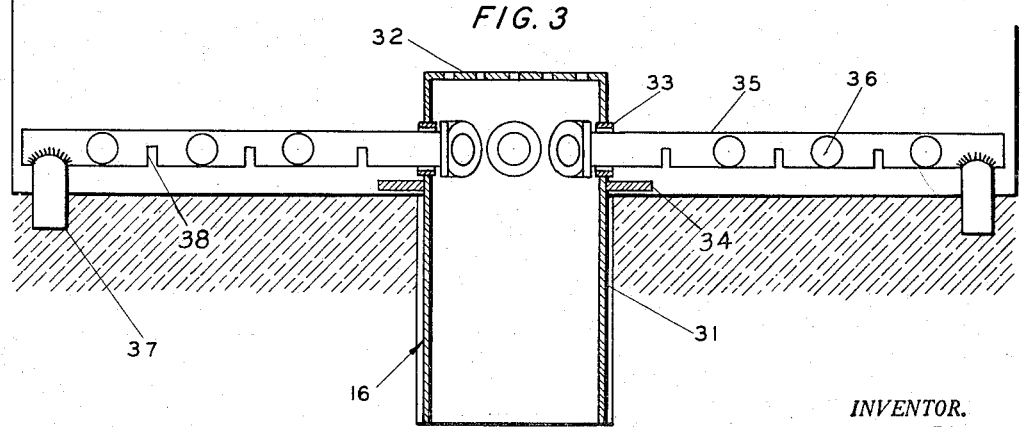
Figures 4, 5:
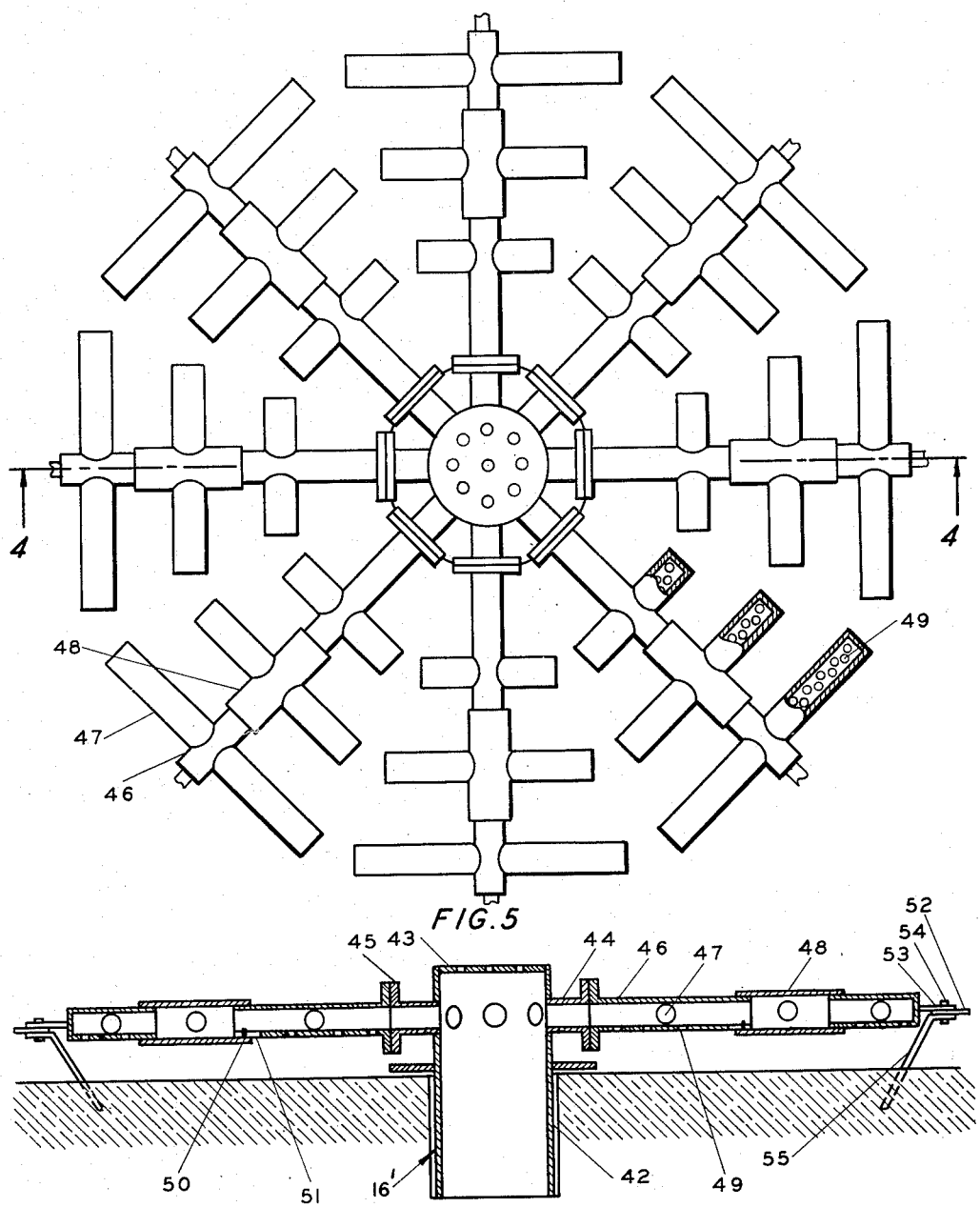

Figure 1 is a partial section view of a reaction chamber containing particulate contact material, which figure shows one embodiment of the invention. Figure 2 is a partial section view of a device embodying a preferred form of the invention. Figure 3 is a horizontal section view taken along the line 3—3 of Figure 1. Figure 4 is a section view of a device embodying another modification of the invention. Figure 5 is a plan view of the device of Figure 4 taken from above.

The reaction chamber of Figure 1 comprises an outer shell 11 which is preferably cylindrical in shape and is closed at each end by closure members 12. This outer shell is preferably substantially vertically disposed and may be provided with insulating means, such as form retaining insulating material 13, which may be any conventionally used form retaining insulating material. The lining is preferably disposed within outer shell 11 and encloses a contact chamber 14 enclosing a contact zone therein. Shell 11 is provided in its upper portion with reactant material inlet means, such as conduit 15. Effluent outlet means 16 is provided in the lower portion of shell 11 and extends upwardly, preferably substantially coaxially with and a spaced distance into contact chamber 14. The outlet means preferably comprises a cylindrical conduit which is closed at its upper end and open at its bottom end. The closure therein may be perforate. Outlet means 16 is provided with flange 17, which flange tends to prevent the escape of effluent materials about the exterior of outlet means 16 when securely seated in or on the insulation lining. A plurality of slip joints 20 are provided in the upper portion of the outlet means. Collector means 18 is provided in the lower portion of the contact chamber. This means comprises a plurality of radially extending perforate conduit members 25 which communicate at their inner ends with outlet means 16. In the collection means of Figure 1, the radially extending perforate conduit members are slidably affixed to the outlet means and are secured therein by collar members 21. Support means, such as tubular supports 19, are provided in the reaction chamber to support the collection means therein and the support means also provides expansion means for the collector means. Expansion means are provided in that members 19 slidably support the conduit members. Further expansion means is provided in the slidable connection between the conduit members and outlet means. The radially extending conduit members are provided with subsidiary conduits 26 which are preferably progressively shorter in length from the outer end of the radially extending conduit members to their inner ends. The conduit members of collector means 18 are perforate, preferably having slots 22 provided in their lower portions. These slots may be of any reasonable width but are preferably not larger than three-eighths inch wide. The conduits are at least partially closed at their ends so as to exclude inert or contact material therefrom. The lower portion of the reaction chamber surrounding and covering the outlet and collection means is filled with particulate aggregate material 23 which may be substantially inert to the reaction being performed within the chamber and which is capable of withstanding temperature changes therein. Such temperatures may range between about 500° F. and about 2000° F. The inert material should be sized so as to be larger in diameter than the width of the perforations within the conduits of the collector means. The remainder of the reaction chamber is filled with any particulate contact material 24, such as those contact materials set forth above, which may be utilized in effecting the desired reaction.

In the operation of the apparatus of Figure 1, reactant material is injected into the reaction chamber through reactant material inlet conduit 15 and is passed downwardly through and in contact with the particulate contact material within the reaction chamber. The contact material is maintained in the upper portion of the reaction chamber by the bed of particulate inert material in the bottom of the chamber. The reactant material flows through the contact material and the inert material to the bottom of the reaction chamber where it passes through the perforations in the collection means, inwardly into the outlet means, and downwardly through the outlet means to a reactant material disposal. When the outlet member is closed at its upper end by a perforate closure member the reactant material which passes downwardly through the center of the chamber will pass directly through the perforate closure member and into the outlet means. Very efficient collection of the chamber effluent is made across the entire cross section of the reaction chamber by means of the radially extending and subsidiary conduit members of the collector means and by means of the perforate closure of the outlet means. This assures substantially the same contact time for all of the reactant materials. Under conditions of elevated temperature, the perforate conduit members of collector 18, and outlet means 16 will expand or having been expanded will contract upon cooling. In order to prevent the perforate conduit members of collector means 18 from warping or breaking loose from outlet means 16, expansion means are provided whereby the conduit members will be allowed to expand or contract at will without losing their communication with the outlet means. Conduit members 25 may, as shown in Figure 1, be slidably affixed, at their inner ends, to outlet means 16 and be supported near their outer ends by support members 19. These support members may cradle the radially extending conduit members 25 while at the same time allowing the conduit members to freely move to and fro in a linear direction during expansion and contraction. In that manner, as the conduit members 25 of collector means 18 expand or contract the expansion or contraction is taken up at the slidable joints between the support, the collector means and the radially extended members without affecting operation of the collection means.

In Figure 2, outlet means 16 comprises a cylindrical conduit 31 having a perforate closure member 32 in its upper end. It is also provided with attachment means, such as a plurality of slip joints 33 near its upper end and has a sealing flange 34 disposed about its circumference relatively close to said slip joints. Perforate conduit members 35 are provided with subsidiary conduits 36 which may extend substantially horizontally and substantially perpendicularly from the perforate conduit members. These subsidiary conduits are at least partially closed at their outer ends so as to exclude particulate inert material and catalyst therefrom, and communicate at their inner ends with the perforate conduit members 35. The subsidiary conduits may, as shown in Figure 3, diminish in length from the outer to the inner ends of conduits 35. Support members 37 are rigidly affixed to conduits 35 at points near their outer ends. These support members may be secured in a reaction chamber in any conventional manner. The inner ends of conduits 35 are inserted into the plurality of slip joints 33 and extend radially from outlet means 16. Perforations 38 are preferably provided in the lower portions of conduits 35 and 36.

The device of Figure 2 operates similarly to that of Figure 1 with the exception that the radially extending perforate members of Figure 2 slidably communicate with outlet means 16 and are rigidly affixed to the support member whereas in Figure 1 the conduit members are slidably affixed to both the outlet means and the support members.

In the device of Figure 4, outlet means 16' comprises a substantially cylindrical conduit 42 which is closed at its upper end by perforate closure member 43. Conduit 42 is provided near its upper end with attachment means, such as a plurality of short extending conduits 44. Conduits 44 are rigidly affixed to conduit 42 at their inner ends and are provided at their outer ends with flange 45. Radially extending conduit members 46 are rigidly affixed and communicate at their inner ends with the short extending arms 44 and are rigidly affixed at their outer ends to the interior of a contact chamber. Subsidiary conduit members 47, which preferably decrease in length from the outer to the inner ends of radially extending conduit members 46, communicate at their inner ends with members 46 and are at least partially closed at their outer ends so as to exclude inert or contact material therefrom. Slip joint means 48 are provided intermediate the ends of members 46. A preferred form for such means is a member which is slightly larger in inner diameter than the outer diameter of members 46. A portion is cut from members 46 leaving a void space therein. Slip joint means 48 is fitted over the ends of the sections of members 46 so as to fill the void space left by the removed portion. Means 48 may be held in place in any conventional manner. One method for holding the member in place is to rigidly secure it, at one end, to one of the sections of member 46 while at the other end it is provided with an interior lug 50. Slot 51 is provided in the other section of member 46 to correspond with lug 50 on means 48. By maintaining the lug in the slot, means 48 will be prevented from turning. Another method would be to provide means 48 with a lug 50 in each end and provide both sections of member 46 with a corresponding slot 51. Means 48 may also be provided with subsidiary conduit members 47. Members 46 and 47 are perforate, having annular openings 49 in their lower portions. One means for affixing the ends of members 46 to reaction chamber is to secure connection members 52 to the walls of the contact chamber while providing members 46 at their ends with connection members 53, which connection members are joined by fastening means, such as bolts 54. An additional support member 55 may be provided in the bottom of the contact chamber and may also be secured to members 52 and 53 by fastening means 54 so as to help support members 46 and at the same time add rigidity to members 52.

The operation of the device of Figure 4 is similar to the collector shown in the lower portion of the reaction chamber of Figure 1 and also to the device shown in Figure 2. In the device of Figure 4, effluent materials are collected in radially extending conduit members 46 and subsidiary conduits 47 and are conveyed to outlet means 16. Effluent products also pass into outlet means 16 through perforate closure member 43. As variations in temperature occur within a contact zone utilizing the device of Figure 4, expansion and contraction of the radially extending arms will be compensated for by the slip joint means 48.

It is not meant to limit this invention to the exact form of the devices shown in each figure. It will be obvious to those skilled in the art that the drawings are schematic and that many modifications may be made in providing expansion means for the radially extending collector arms of the collection system. It will also be obvious that similar expansion means may be provided in the subsidiary conduits. The perforations provided in the radially extending conduit members and the subsidiary conduits may be annular in shape as shown in Figure 4 or may be slots such as those shown in Figures 1 and 2. These perforations may likewise be provided in all portions of the radially extending conduits and their subsidiaries though it is believed that lesser amounts of entrained catalyst will be carried into the collector system by placing the perforations on the bottom portions of these conduit members. Similar modifications may be made in the method of affixing slip joint means 48 in place in radially extended conduit members 46. It is contemplated that collars or rings may be secured on the exterior surface of conduit members near the point from which a section is removed, which collars or rings will prevent slip joint means 48 from sliding too far on one section of the conduit and thus becoming disengaged from the other section thereof. It is also obvious that by giving the radially extending and subsidiary conduits a slight slope inwardly, a better flow of liquids therethrough will be effected. The subsidiary conduits may be positioned vertically as well as horizontally, or at any angular position therefrom.

The collection system, as positioned within the contact chamber, substantially subdivides the cross section of the chamber into relatively small areas. In that manner, liquid or vapor effluent materials within those small areas, taking the line of least resistance, will pass into and through the perforate conduits and into the outlet means. A layer of contact material sufficiently thick to provide proper conversion is maintained over the top of the layer of aggregate inert material covering the collector system. The contact material for many reactions may be regenerated by passing a preheated mixture of an oxygen-containing regeneration gas and steam through the contact chamber for a period of time sufficient to oxidize carbonaceous deposits therein.

*Example*

A virgin gas oil is used as a charge stock to a catalytic cracking unit using a collector system of this invention. The oil is fed to a preheater at a temperature of about 305° F. and a pressure of about 265 p. s. i. g. where it is heated to a temperature of about 1040° F. and combined with approximately 30 pounds of steam per barrel of oil and the pressure is reduced to approximately 97 p. s. i. g. The preheated oil-steam mixture is passed to the top of a conversion chamber containing a layer of crushed fire brick, at least ½ inch in diameter, covering the collector system conduits and the outlet means, and also containing approximately 60,000 pounds of particulate bauxite catalyst of 4–16 mesh. The mixture is injected thereinto at a temperature of about 1020° F. and a pressure of about 85 p. s. i. g. at a rate of about 250 barrels per hour. Reactant materials together with conversion products pass downwardly through the contact chamber, through perforations in the collector system conduits, which perforations are up to ⅜ inch in width, and into the outlet means of the conversion chamber at a temperature of about 940° F. and pressure of about 81 p. s. i. g. These effluent materials are passed through a heat exchanger wherein the temperature of the effluent materials is lowered to approximately 475° F., at which temperature they are passed to a fractionator. After a period of operation in which the deposition of carbonaceous materials upon the catalyst becomes so great as to be undesirable, the reactant feed is cut off and air, at the rate of about 125,000 cubic feet per hour, together with about 30,000 pounds of steam per hour is injected into the upper portion of the contact chamber at a temperature of about 1100° F. and a pressure of approximately 95 p. s. i. g. The carbonaceous deposit is removed by oxidation and the steam acts to absorb heat of the exothermic oxidation reaction. The effluent is removed from the chamber at a temperature of approximately 1350° F. and a pressure of about 82 p. s. i. g. Regeneration is continued until the chamber effluent contains only about 2% carbon dioxide at which time the air-steam mixture is cut off and reactant feed is turned into the chamber once again.

As the temperature of the chamber is initially raised from normal temperature to operating temperature, and later as the temperature is increased during regeneration, and later cooled at the start of the next operating cycle, the collector system expands and contracts without disruption while retaining its efficiency.

As will be evident to those skilled in the art, various other modifications of this invention can be made or followed in the light of the foregoing disclosure and discussion without departing from the spirit or scope of the disclosure or from the scope of the claims.

I claim:

1. A reaction chamber, adapted to contain particulate contact material, comprising in combination a closed outer shell enclosing a contact chamber therein; reactant material inlet means in the upper portion of said shell; effluent outlet means extending upwardly, centrally through the bottom of said shell a spaced distance into said contact chamber, said effluent outlet means being closed at its upper end at least enough to substantially prevent the passage of solid material therethrough; effluent collection means comprising a plurality of perforate conduit members radially extending outwardly through the walls of said effluent outlet means to points adjacent the periphery of said chamber, the inner end of at least one portion of each radially extending conduit being slidably supported by a support member; and support means in the bottom portion of said chamber supporting the outer end portions of said radially extending conduits.

2. The reaction chamber of claim 1, wherein the extreme inner ends of extending conduit members are slidably affixed in the wall of said effluent outlet means.

3. The reaction chamber of claim 2, wherein a plurality of perforate subsidiary conduits extend laterally from said radially extending conduits.

4. The reaction chamber of claim 1, wherein each said radially extending conduit member comprises a first conduit section rigidly affixed at its inner end in the wall of said effluent outlet means; a second conduit section rigidly affixed at its outer end portion to said support means; and sleeve means enclosing and extending from the inner end of said second conduit section and enclosing the outer end of said first conduit section so as to slidably support the inner end of said second conduit section in axial alignment with said first conduit section.

5. The reaction chamber of claim 4, wherein a plurality of perforate subsidiary conduits extend laterally from said radially extending conduits.

6. The reaction chamber of claim 1, wherein the extreme inner ends of said radially extending conduit members are slidably affixed in the wall of said effluent outlet means; and the extreme outer end portions are rigidly affixed to said support means.

7. The reaction chamber of claim 6, wherein a plurality of perforate subsidiary conduits extend laterally from said radially extending conduits.

8. The reaction chamber of claim 1, wherein the extreme inner ends of said radially extending conduit members are slidably affixed in the wall of said effluent outlet means; and the extreme outer end portions are slidably affixed to said support means.

9. The reaction chamber of claim 8, wherein a plurality of perforate subsidiary conduits extend laterally from said radially extending conduits.

10. A reaction chamber, adapted to contain particulate contact material, comprising in combination a closed outer shell enclosing a contact chamber therein; reactant material inlet means in the upper portion of said shell; effluent outlet means extending upwardly through the bottom of said shell a spaced distance into said contact chamber, said effluent outlet means being closed at its upper end at least enough to substantially prevent the passage of solid material therethrough; effluent collection means comprising a plurality of perforate conduit members radially extending outwardly through the walls of said effluent outlet means to points adjacent the periphery of said chamber, the inner end of at least one portion of each radially extending conduit being slidably supported by a support member; a plurality of perforate subsidiary conduits extending laterally from said radially extending conduits; and support means in the bottom portion of said chamber supporting the outer end portion of each said radially extending conduit.

11. In apparatus for conducting a contact process and including a casing defining a chamber wherein a fluid charge is passed through a mass of solid contact material; the improvement comprising a collecting centrally located conduit means in the base portion of said chamber, an arrangement of tubing formed of a plurality of horizontally extending sections connected to said conduit means within said base portion of the chamber and spaced upwardly from the bottom of the chamber, said sections having spaced inlet openings to receive fluid flowing downwardly through said mass, means supporting the outer ends of said sections adjacent the circumference of said casing, and joint means for flow of fluid therethrough providing slidable expansion and contraction of metal in said sections.

12. In apparatus for conducting a contact process and including a casing defining a chamber wherein a fluid charge is passed through a mass of solid contact material; the improvement comprising a collecting centrally located conduit means in the base portion of said chamber, an arrangement of tubing formed of a plurality of laterally extending sections connected to said conduit means within said base portion of the chamber and spaced upwardly from the bottom of the chamber, said sections having spaced inlet openings to receive fluid flowing downwardly through said mass, means supporting the outer ends of said sections adjacent the circumference of said casing, and joint means for flow of fluid therethrough providing slidable expansion and contraction of metal in said sections.

13. In apparatus for conducting a contact process and including a casing defining a chamber wherein a fluid charge is passed through a mass of solid contact material, said casing having a port at the bottom thereof; the improvement comprising a header within the lower portion of said chamber and opening downwardly through said port, a pair of trunk tubes extending laterally from opposite sides of said header, transversely spaced branch tubes extending laterally from opposite sides of said trunk tubes, said branch tubes being apertured therealong for passage of fluid and freely slidable slip-joint connection between the trunk tubes and the header and between the branch tubes and the trunk tubes, and means supporting the outer ends of said trunk tubes adjacent the circumference of said casing.

14. In apparatus for conducting a contact process and including a casing defining a chamber wherein a fluid charge is passed through a mass of solid contact material; the improvement comprising a collecting centrally located conduit means in the base portion of said chamber, an arrangement of tubing formed of a plurality of laterally extending sections connected to said conduit means within said base portion of the chamber and spaced upwardly from the bottom of the chamber, said sections having spaced inlet openings to receive fluid flowing downwardly through said mass, means supporting the outer ends of said sections adjacent the circumference of said casing, joint means for flow of fluid therethrough providing slidable expansion and contraction of metal in said sections, and a porous body of inert solid divided material distinct from said contact material at the bottom of the chamber and embedding said tubing and said collecting centrally located conduit means to support the mass of contact material and transmit the load thereof to the bottom of the casing and distribute the load over the area of the bottom.

ALEXANDER R. REHRIG.

References Cited in the file of this patent

UNITED STATES PATENTS

| Number | Name | Date |
| --- | --- | --- |
| 2,364,775 | Brice | Dec. 12, 1944 |